Patented Dec. 3, 1929

1,737,841

UNITED STATES PATENT OFFICE

WILLIAM J. HALE AND EDGAR C. BRITTON, OF MIDLAND, MICHIGAN, ASSIGNORS TO THE DOW CHEMICAL COMPANY, OF MIDLAND, MICHIGAN, A CORPORATION OF MICHIGAN

MANUFACTURE OF PHENOL

No Drawing. Application filed February 21, 1923. Serial No. 620,486.

In the synthetic preparation of those hydroxylic derivatives of benzene and its homologues classified as phenols, and particularly of mono-hydric phenols, the only process that has had any considerable commercial development is that wherein the salt of the corresponding sulphonic acid is fused with potassium or sodium hydroxide; this despite the discovery of Dusart and Bardy (Compt. Rend. 74, 1051 (1872)) that chloro-benzene is hydrolyzed by caustic soda in aqueous solution at 300 degrees C. The further experimental evidence touching this reaction, which was published by K. H. Meyer and F. Bergius (Ber. 47, 3155 (1914)), has apparently resulted in no commercial development of the process involved.

Apparently the practical applicability of the process in question has been rendered negative by reason of the corresponding relatively large amount of diphenyl ether simultaneously produced with the phenol and the absence of any method for immediate hydrolysis of this ether without recourse to expensive caustics.

It has been correctly noted by Meyer and Bergius (vid. supra) that diphenyl oxide itself is markedly indifferent toward hydrolysis by water alone, but that with free alkali this hydrolysis becomes measurable and when three molecules of alkali are present the hydrolysis approaches completion. That condition where chloro-benzene was made to re-act with only one molecule of alkali was looked upon more particularly as a reaction for diphenyl oxide production. Even in the presence of 3 to 4 molecules of caustic soda, Meyer and Bergius found that chloro-benzene, suffering first a simple hydrolysis to phenol and intermediate reaction of sodium phenate with free chloro-benzene to give diphenyl oxide, could not be made to yield over 91 per cent in phenol during prolonged (26 hours) heating at 300 degrees C.

We have discovered, however, that the reaction between diphenyl oxide and an alkali metal phenate solution under properly controlled conditions of temperature and pressure is markedly productive of free phenol; in other words, that a salt of a strong base (e. g. sodium) and a weak acid (e. g. phenol) is found to play an exactly similar role to that of free caustic. If the phenol as such is removed from the reaction product, we have further discovered that the existent equilibrium is disturbed and that by adding another portion of diphenyl oxide, and subjecting the mixture to further heating, an additional quantity of diphenyl oxide will be hydrolyzed; consequently a continuous supply of diphenyl oxide to the system makes theoretically possible a continuous production of phenol without addition of free alkali.

The object of the present invention accordingly is to provide a method or process for making phenol wherein diphenyl oxide may be thus provided and hydrolyzed to form the desired product. To the accomplishment of this and related ends, the invention, then, consists of the steps hereinafter fully described and particularly pointed out in the claims, the following description setting forth but one of the various ways in which the principle of the invention may be used.

In practice we have proceeded substantially as follows: An aqueous solution of sodium phenate is made up to the desired concentration and a quantity of diphenyl oxide added thereto. This mixture is then quickly heated in an autoclave to the temperature of the reaction which is effective from 300° C. or better above 350° C. and is there maintained for about fifteen minutes, after which it is cooled and the free phenolic layer separating out is removed. The pressure during the reaction will preferably be such as to maintain substantial proportions at least of the solution in liquid phase. Whatever free phenol remains in the liquor is now neutralized with caustic and the liquor again charged with diphenyl oxide or, what is to the same end, with chlorobenzene (which latter will re-act with a portion of the sodium phenate present during the warming stage to give diphenyl oxide), and the mixture again heated to reaction temperature. The sodium phenate content must of course be held in large excess as it is the active agent in the hydrolysis of diphenyl oxide. On stated occasions there is conducted an evaporation of the sodium phenate liquors for removal of the accumulated salt followed by final redilution before further use.

Though the possible reaction of phenol to lose water and to produce diphenyl oxide may be somewhat repressed by this addition of diphenyl oxide, the repression can only come about at the temperature where diphenyl oxide is hydrolyzed, namely, 300 degrees C. or above. Even in the presence of thorium oxide, as investigated and recommended to this end by Sabatier and Mailhe (Compt. Rend. *151*, 492 (1910)), a temperature of 450 degrees C. was found most favorable for a fifty per cent dehydration of phenol to diphenyl oxide and simultaneously for a fifty per cent hydrolysis of diphenyl oxide to phenol. The comparative ease with which chloro-benzene re-acts upon sodium phenate to give diphenyl oxide would indicate therefore that a mixture of chloro-benzene and one molecule of sodium hydroxide during initial warming must proceed largely to the formation of diphenyl oxide before any possibility of the diphenyl oxide already present to engage itself in re-action. If this were otherwise, we should require the addition of only a small amount of diphenyl ether to an equimolecular chloro-benzene-caustic soda mixture in order to force the chloro-benzene through its simple and complete hydrolysis to phenol and at the same time we should be able to recover the diphenyl oxide previously added. Such, however, is not the case; large quantities of diphenyl oxide may be continuously supplied to an equimolecular chloro-benzene-caustic soda solution and only very small amounts of the diphenyl oxide are ever recoverable.

In summation, we may describe our process as one primarily constituted for the production of free phenol by the action of diphenyl oxide upon an acqueous solution of an alkali or alkaline earth metal salt of phenol, the process involving the removal of this free phenol and again charging the residual phenate solution with diphenyl oxide or with any solution capable of yielding a high percentage of diphenyl oxide. Such sources of diphenyl oxide, however, should always be in more or less highly concentrated mixtures and preferably are made up of chloro-benzene or other monohalogenated aromatic hydrocarbons and small amounts of alkali or alkaline earth metalhydroxides; the excess of chloro-benzene over the corresponding equivalent of alkali used is of course reacted upon by the sodium phenate, always present in the system in large amounts, to produce a still further quantity of diphenyl oxide. The foreging reaction may be graphically represented by the following equation, viz:

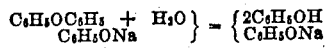

When the original sodium phenate solution is kept constantly in very large excess over the diphenyl oxide producing mixture admitted, the addition of free alkali to the system is in no wise necessary. In order, however, to keep this large excess of sodium phenate constant, a small amount of sodium phenate should be added to the mixture after it leaves the reaction chamber or (what is the equivalent) a little free alkali should be added to this same mixture (rich in free phenol) and thus make possible the retainment of a slightly additive amount of sodium phenate in the system. If, on the other hand, a mixture of chloro-benzene and a less than one equimolecular equivalent of caustic soda is used as a source of diphenyl oxide, there will be no need for an additional quantity of sodium phenate for the reason that this diphenyl oxide producing mixture, during the initial warming stage, does not yield its diphenyl oxide without at the same time a certain small proportionate amount of sodium phenate. This warming process moreover must be carried on as quickly as possible so that the production of diphenyl oxide is primarily favored. Such period does not extend over one single hour as heretofore mentioned.

We wish distinctly to state that where sodium phenate is employed as hereinbefore described, it does not combine with any ingredient present, but serves only as a catalyst. Through its presence, hydroxide ions are furnished in the solution and these suffice for the hydrolysis of diphenyl oxide directly into free phenol. On the other hand, sodium hydroxide will effect an even more rapid hydrolysis of diphenyl oxide, but the phenol thus produced will be found combined with the sodium hydroxide in the form of sodium phenate. This constitutes evidence of the fact that such sodium hydroxide actually enters into the reaction and distinguishes it from sodium phenate and the equivalent compounds hereinbefore referred to which play the same role so far as hydrolyzing the phenyl dioxide, but do not enter into chemical combination with the resulting phenol.

In conclusion it will be observed that all salts of strong bases and weak acids, which in themselves do not bring about a substitution reaction in phenols, will function in the same manner as sodium phenate is thus seen to function, in that they will not enter into the reaction with the diphenyl oxide.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. A process of the character described, which comprises heating diphenyl oxide under pressure in the presence of water and a hydrolytic catalyst salt of an alkali-forming metal.

2. A process of the character described, which comprises heating diphenyl oxide under pressure in the presence of water and a phenol salt of an alkali-forming metal.

3. A process of the character described, which comprises hydrolyzing diphenyl oxide by heating under pressure in the presence of water and sodium phenate, and replenishing the supply of diphenyl oxide.

4. A process of the character described, which comprises heating diphenyl oxide under pressure in the presence of water and a hydrolytic catalyst salt of an alkali-forming metal, and replenishing the supply of diphenyl oxide.

5. A process of the character described, which comprises heating diphenyl oxide under pressure in the presence of water and a phenol salt of an alkali-forming metal, and replenishing the supply of diphenyl oxide.

6. A process of the character described, which comprises hydrolyzing diphenyl oxide by heating under pressure in the presence of water and an excess of sodium phenate, removing phenol and supplying additional diphenyl oxide.

Signed by us, this 15th day of February, 1923.

WILLIAM J. HALE.
EDGAR C. BRITTON.